United States Patent
Than Trong et al.

(10) Patent No.: US 8,231,276 B2
(45) Date of Patent: Jul. 31, 2012

(54) SLIDING MATERIAL, METHOD OF MANUFACTURING SAME AND BEARING ASSEMBLY

(75) Inventors: Long Than Trong, Yokohama (JP);
Satoshi Namba, Yokohama (JP);
Nobuyuki Yasu, Yokohama (JP);
Kazuma Mukai, Higashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1104 days.

(21) Appl. No.: 12/126,374

(22) Filed: May 23, 2008

(65) Prior Publication Data

US 2008/0292235 A1  Nov. 27, 2008

(30) Foreign Application Priority Data

May 25, 2007  (JP) .................. P2007-138683

(51) Int. Cl.
*F16C 33/02* (2006.01)
*F16C 33/24* (2006.01)
*F16C 33/28* (2006.01)

(52) U.S. Cl. ........ 384/276; 384/297; 384/300; 384/420; 29/898.041

(58) Field of Classification Search .............. 384/276, 384/279, 282, 300, 297, 902, 420, 908, 911, 384/912; 428/421, 458, 626, 209; 29/898.041
See application file for complete search history.

(56) References Cited

U.S. PATENT DOCUMENTS

| | | | | |
|---|---|---|---|---|
| 2,648,580 A | * | 8/1953 | Lignian | ........................ 384/276 |
| 4,000,982 A | | 1/1977 | Ueda | |
| 4,238,137 A | * | 12/1980 | Furchak et al. | .................. 384/36 |
| 4,658,500 A | * | 4/1987 | Engel et al. | ...................... 29/724 |
| 4,732,818 A | | 3/1988 | Pratt et al. | |
| 5,091,098 A | * | 2/1992 | Tanaka et al. | .................. 508/104 |
| 5,300,366 A | * | 4/1994 | Nakamaru et al. | ............ 428/549 |
| 5,447,774 A | | 9/1995 | Tanaka et al. | |
| 6,416,846 B2 | | 7/2002 | Long | |
| 6,548,188 B1 | * | 4/2003 | Yanase et al. | .................. 384/300 |
| 6,966,753 B2 | * | 11/2005 | Long et al. | .................. 415/213.1 |
| 7,172,343 B2 | * | 2/2007 | Kinno et al. | .................. 384/492 |
| 7,249,890 B2 | * | 7/2007 | Bickle et al. | .................. 384/279 |

FOREIGN PATENT DOCUMENTS

| | | | |
|---|---|---|---|
| CN | 1129625 A | | 8/1996 |
| CN | 1373708 A | | 10/2002 |
| DE | 3906402 A1 | * | 9/1990 |
| JP | 63097663 A | * | 4/1988 |
| JP | 7-133825 | | 5/1995 |
| JP | 09196057 A | * | 7/1997 |
| JP | 10-29256 | | 2/1998 |
| JP | 2000356222 A | * | 12/2000 |
| JP | 2007154170 A | * | 6/2007 |

* cited by examiner

*Primary Examiner* — Marcus Charles

(74) *Attorney, Agent, or Firm* — Oblon, Spivak, McClelland, Maier & Neustadt, L.L.P.

(57) ABSTRACT

A sliding material sliding material includes: a sliding plane member; a base member made of a material different from that of the sliding plane member; an intermediate member provided between the sliding plane member and the base member and formed with a plurality of spaces; and a joining member for bonding the intermediate member to the base member, in which a portion of the space formed to the intermediate member is impregnated with a portion of the sliding plane member so that the sliding plane member is bonded to the intermediate member, and a residual portion of the space of the intermediate member is impregnated with a portion of the joining member so that the base member is bonded to the intermediate member with the joining member therebetween.

9 Claims, 14 Drawing Sheets

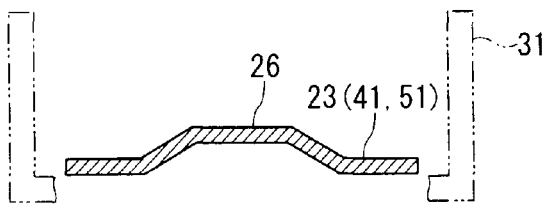
FIG. 7A PLACE INTERMEDIATE MEMBER IN METAL DIE
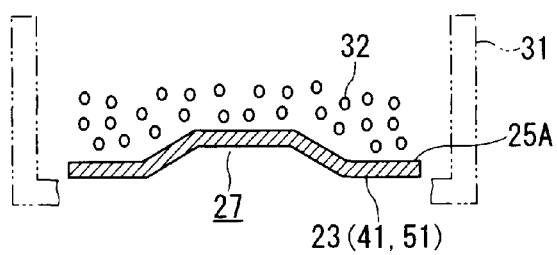
FIG. 7B INSERT POWDER OF SLIDING PLANE MEMBER
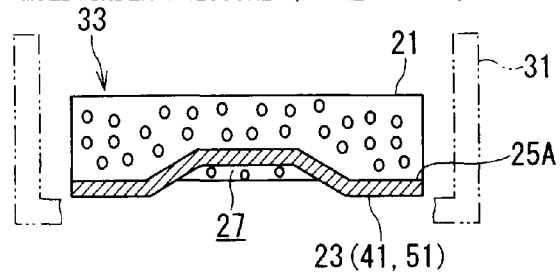
FIG. 7C MOLD UNDER PRESSURE (IMPREGNATION)
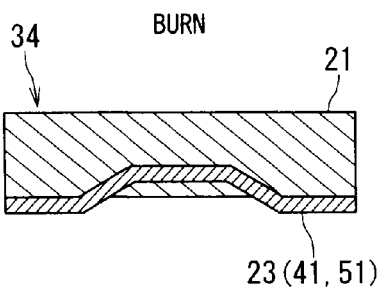
FIG. 7D BURN
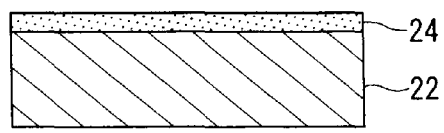
FIG. 7E PLACE JUNCTION MEMBER ON BASE MEMBER
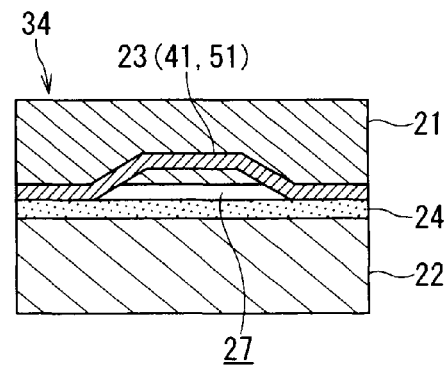
FIG. 7F PLACE SLIDING PLANE MEMBER AND INTERMEDIATE MEMBER
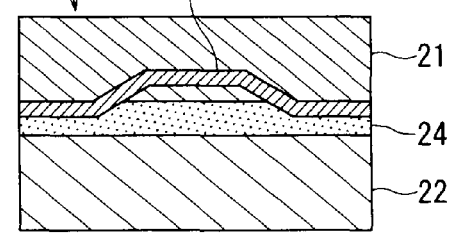
FIG. 7G HEAT AND JOIN

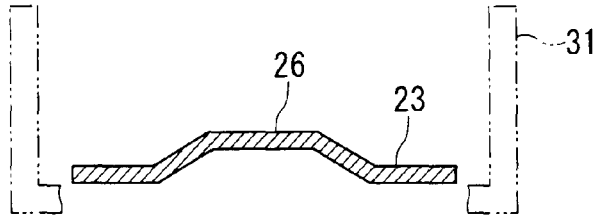
FIG. 8A PLACE INTERMEDIATE MEMBER IN METAL DIE
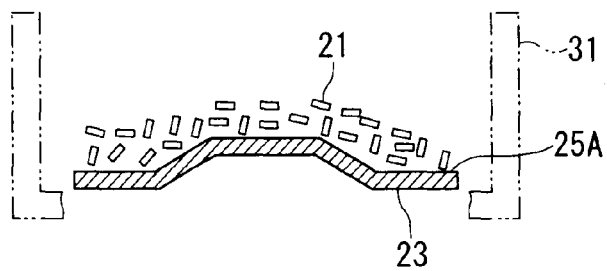
FIG. 8B INSERT PELLET (SLIDING PLANE MEMBER)
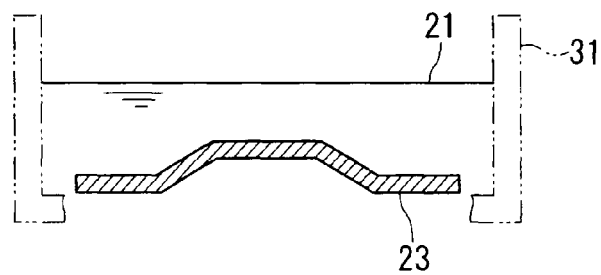
FIG. 8C HEAT AND MELT SLIDING PLANE MEMBER
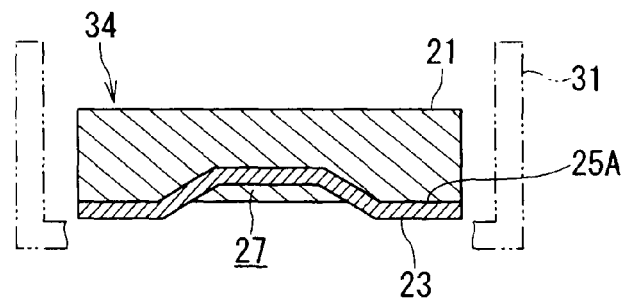
FIG. 8D IMPREGNATE AND MOLD

SLIDING MATERIAL, METHOD OF MANUFACTURING SAME AND BEARING ASSEMBLY

BACKGROUND OF THE INVENTION

1. Field of the Invention

The present invention relates to a sliding material suitable for a sliding member of a bearing assembly, a method of manufacturing the sliding material, and the bearing assembly.

2. Related Art

Recently, with the progress of the industrial technology, it has been required to realize speed-up and high bearing stress of various bearings. Hitherto, as a sliding material for a sliding member of a bearing assembly, soft metallic materials, such as a white metal (first kind: Sn: 88 to 92 wt %, Sb: 5 to 7 wt %, Cu 3 to 5 Wt %, for example) have been used. However, melting point of these soft metallic materials is low so that the range of use is limited due to problems such as large reduction in strength and seizure at high temperature.

On the other hand, a polytetrafluoroethylene (PTFE) resin material has a low frictional coefficient and is excellent in heat resistance and hence is suitable for a sliding material of the bearing assembly. Further, a polyetheretherketone (PEEK) resin material and a polyimide (PI) resin material are excellent in mechanical properties at high temperature though they have a rather higher frictional coefficient in comparison with the PTFE resin material. To these resin materials, various ceramic fibers or particle fillers may be added so as to produce a sliding material combining mechanical properties with frictional and wearing characteristics.

For a bearing, especially for a bearing supporting a high load, it is required that a sliding member of a bearing is composed by using a sliding material produced by joining the above-mentioned resin material for a sliding plane member and a metallic base material for supporting the high load.

However, at the time of the joining between a resin material and a metallic material, in a conventional bonding method applied to the joining between metallic materials, it is difficult to have a sufficient bonding strength, providing a problem. For example, when different metallic materials are joined together by a molten metal solidification technique, a diffusion reaction occurs because of both metals are joined such that physical or chemical bonding occurs as well as mechanical bonding to achieve a sufficient bonding strength.

On the other hand, when a resin material and a metallic material are joined together by the molten metal solidification technique, it is difficult to have a sufficient bonding strength because of the simple mechanical bonding. When a resin material and a metallic material are joined together under high-temperature and high-pressure conditions, there may also cause a problem such that the resin material is deteriorated and the manufacturing cost increases due to long term duration under such conditions.

Furthermore, when a resin material and a metallic material are joined together, an adhesive may also be used. However, in this case, it is difficult to select an adhesive preferable for both the resin material and the metallic material. Furthermore, in a resin adhesive, since a junction interface certainly exists between the resin and the metal, the bonding strength between the resin material and the metallic material may not be essentially improved.

As a method for improving the strength of the junction interface between two kinds of members are joined, it has been known to increase a junction area by expanding a surface area with honing or chemical etching. However, since the expansion of the surface area with the honing or chemical etching has a limit and the resistance against the shear peeling off the junction interface is small, the bonding strength between different materials may not be improved sufficiently.

On the other hand, as a method of sufficiently improving the bonding strength between the resin material and the metallic material, it has been proposed to laminate resin materials on a surface of the metallic material while filling a resin material into a porous intermediate layer provided on the surface of a metallic material (refer to Patent Publication 1: Japanese Unexamined Patent Application Publication No. H10-29256).

According to the technique described in the above Patent Publication 1, it is necessary for the porous intermediate layer to be previously joined to the metallic material in vacuum condition. When composing a bearing for supporting a high load, such as a bearing for a hydraulic power generation instrument by using this technique, the sliding material of the bearing is composed of the sliding plane resin material and the metallic base material. In a case where the total weight of the sliding member of this bearing ranges from several hundreds kg to several tons, the process of joining the porous intermediate layer to the metallic base material will be performed in very large scale, so that the manufacturing cost is increased and there is a limit for vacuum equipment capacity.

In view of the above matters, when the sliding member of the bearing is produced by using a sliding material made by joining different materials, i.e., a resin material and a metallic material, it has been required to provide a preferable friction and wearing characteristics, an excellent sliding performance, and a desirable bonding strength between the sliding plane member and the base member, and not to depend on the equipment capacity, with reduced manufacturing cost.

SUMMARY OF THE INVENTION

The present invention was conceived in consideration of the circumstances encountered in the prior art mentioned above, and an object thereof is to provide a sliding material, a method of manufacturing the same, and a bearing assembly that are excellent in sliding performance and reliability, not dependent on the equipment capacity, and capable of reducing the manufacturing cost.

The above and other objects of the present invention can be achieved by providing, in one aspect, a sliding material comprising:

a sliding plane member;

a base member made of a material different from that of the sliding plane member;

an intermediate member provided between the sliding plane member and the base member and including a plurality of spaces; and a joining member for bonding the intermediate member to the base member, wherein a portion of the space of the intermediate member is impregnated with a portion of the sliding plane member so that the sliding plane member is bonded to the intermediate member, and residual portion of the space of the intermediate member is impregnated with a portion of the joining member so that the base member is bonded to the intermediate member with the joining member therebetween.

In the above aspect, it may be desired that the intermediate member is a plate-shaped metallic component member, and at least one of the top surface and the bottom surface of the component member is provided with a plurality of convex-shaped protrusions to form the space inside, and the protrusion is formed with an opening for communicating the top surface with the bottom surface of the component member.

The protrusion is linearly formed and both ends thereof may be integrated with the component member, and openings are formed at a lower portion of the protrusion in a direction perpendicular to the linear direction so as to oppose to each other for communicating the top surface with the bottom surface of the component member.

The protrusion may be circularly formed and periphery thereof is integrated with the component member, and an opening is formed at a most projected position of the protrusion for communicating the top surface with the bottom surface of the component member.

It may be desired that one end of the protrusion is integrated with the component member while the other end is provided with an opening directed in a same direction with respect to the component member for communicating the top surface with the bottom surface of the component member.

It may be further desired that the intermediate member is provided with a plurality of same or different protrusions formed on at least one of the top surface and the bottom surface of the component member in a linear arrangement or in a staggered arrangement.

The sliding plane member may be made of either one of a polytetrafluoroethylene (PTFE) resin material, a polyetheretherketone (PEEK) resin material, a polyimide (PI) resin material, and a composite material made by adding ceramic fibers or particle fillers to either one of the resins.

The joining member may be made of a metallic material of Sn with a melting point lower than that of the sliding plane member or with the melting temperature lower than that of the sliding plane member.

In another aspect of the present invention, there is also provided a method of manufacturing a sliding material including a sliding plane member and a base member made of a material different from that of the sliding plane member, in which a portion of a space formed to an intermediate member is impregnated with a portion of the sliding plane member so that the sliding plane member is bonded to the intermediate member, and a residual portion of the space of the intermediate member is impregnated with part of a joining member so that the base member is bonded to the intermediate member with the joining member therebetween, the manufacturing method comprising the steps of:

placing the intermediate member in a molding die;

pouring powder of the sliding plane member into the molding die;

stacking the sliding plane member on the surface of the intermediate member while impregnating a portion of the space formed to the intermediate member with a portion of the powder of the sliding plane member to form a molded body; and burning the molded body so as to produce a junction body of the sliding plane member and the intermediate member.

In a further aspect, there is also provided a method of manufacturing a sliding material including a sliding plane member and a base member made of a material different from that of the sliding plane member, in which a portion of a space formed to an intermediate member is impregnated with a portion of the sliding plane member so that the sliding plane member is bonded to the intermediate member, and a residual portion of the space of the intermediate member is impregnated with a portion of a joining member so that the base member is bonded to the intermediate member with the joining member therebetween, the manufacturing method comprising the steps of:

placing the intermediate member in a molding die;

inserting solids of the sliding plane member into the molding die;

melting the sliding plane member within the molding die; and stacking the sliding plane member on the surface of the intermediate member while impregnating a portion of the space formed to the intermediate member with a portion of the melt sliding plane member so as to produce a junction body of the sliding plane member and the intermediate member.

The above methods may further include the steps of: placing a sheet-shaped joining member on the surface of the base member; placing the junction body of the sliding plane member and the intermediate member on the joining member; and bonding the base member to the junction body with the joining member by heating the joining member until a melting point thereof.

The above methods may further includes the steps of: forming the joining member on the surface of the base member by at least one of a clad metal rolling method, a fusion dipping method, a thermal spraying method, and a vacuum deposition, or forming the powder of the joining member on the surface of the base member by a coating method or a printing method; placing the junction body of the sliding plane member and the intermediate member on the joining member; and bonding the base member to the junction body with the joining member by heating the joining member until a melting point thereof.

The above methods may further includes the steps of: placing the junction body of the sliding plane member and the intermediate member on the surface of the base member; dipping the base member having the junction body placed thereon into a molten joining member; and pulling up the junction body and the base member from the molten joining member.

In a still further aspect, the present invention further provides a bearing assembly comprising a thrust bearing member for slidably supporting a thrust load in an axial direction of a rotational shaft or a guide bearing member for slidably supporting a shaft vibration in a rotational direction of the rotational shaft, the thrust bearing member and the guide bearing member being formed by using a sliding material of the characters mentioned hereinabove.

In the sliding material and its manufacturing method according to the present invention of the characters mentioned above, a portion of the space formed to the intermediate member is impregnated with a portion of the sliding plane member so that the sliding plane member is bonded to the intermediate member, and a residual portion of the space of the intermediate member is impregnated with a portion of the joining member so that the base member is bonded to the intermediate member with the joining member therebetween, and the sliding plane member is integrally bonded to the base member.

Accordingly, the intermediate member has a reacting force against a force in a direction for peeling or breaking the sliding plane member and the joining member off the intermediate member. This is a resultant force of forces which are parallel with the joining interface between the sliding plane member and the intermediate member and the joining interface between the intermediate member and the joining member, respectively. As a result, the bonding strength between the sliding plane member and the base member is increased, thus improving the reliability of the sliding material.

Furthermore, owing to frictional and wearing characteristics of the sliding plane member, the sliding performance of the sliding material can be increased.

When the sliding plane member and the intermediate member are bonded by the impregnation, and the base member is bonded to the intermediate member with the joining member therebetween, according to the present invention any vacuum equipment is not required. Accordingly even when the base member is heavy one, the sliding material is not dependent on the equipment capacity, thereby making the sliding material at low cost.

In the bearing assembly according to the present invention, the sliding material used in the thrust bearing member or the guide bearing member is excellent in sliding performance and reliability and is not dependent on the equipment capacity. The manufacturing cost can be reduced as well, so that in these bearing devices, the sliding performance and reliability are also improved.

The nature and further characteristic features of the present invention will be made clearer from the following descriptions made with reference to the accompanying drawings.

BRIEF DESCRIPTION OF THE DRAWINGS

In the accompanying drawings:

FIGS. 2A and 2B show the sliding member of a thrust bearing member shown in FIG. 1, in which FIG. 2A is a sectional view and FIG. 2B is a perspective view;

FIGS. 6A to 6E show an intermediate member of the sliding material shown in FIG. 5, in which FIG. 6A is a plan view and FIGS. 6B to 6E are sectional views taken along the lines VIB-VIB, VIC-VIC, VID-VID and VIE-VIE of FIG. 6A, respectively;

FIGS. 7A to 7G are illustrations showing manufacturing processes of the sliding material of FIG. 5;

FIGS. 8A to 8D are illustrations showing another example of the manufacturing processes of the sliding material of FIG. 5;

FIGS. 11A to 11D show the intermediate member of the sliding material shown in FIG. 10, in which FIG. 11A is a plan view and FIGS. 11B to 11D are sectional views taken along the lines XIB-XIB, XIC-XIC, and XID-XID of FIG. 11A, respectively;

FIGS. 13A to 13D show the intermediate member of the sliding material shown in FIG. 12, in which FIG. 13A is a plan view and FIGS. 13B to 13D are sectional views taken along the lines XIIIB-XIIIB, XIIIC-XIIIC, and XIIID-XIIID of FIG. 13A, respectively;

FIGS. 14A to 14C show an intermediate member in a fourth embodiment of the sliding material according to the present invention, in which FIG. 14A is a plan view and FIGS. 14B and 14C are sectional views taken along the lines XIVB-XIVB and XIVC-XIVC of FIG. 14A, respectively;

FIGS. 15A to 15C show an intermediate member in a fifth embodiment of the sliding material according to the present invention, in which FIG. 15A is a plan view and FIGS. 15B and 15C are sectional views taken along the lines XVB-XVB and XVC-XVC of FIG. 15A, respectively.

DESCRIPTION OF THE PREFERRED EMBODIMENTS

Preferred embodiments according to the present invention will be described hereunder with reference to the accompanying drawings, in which terms "upper", "lower", "right", "left" and the like terms are used with reference to the illustrations of the drawings or in an actually installed state of a sliding material.

First Embodiment (FIGS. 1 to 9)

Figure 1:
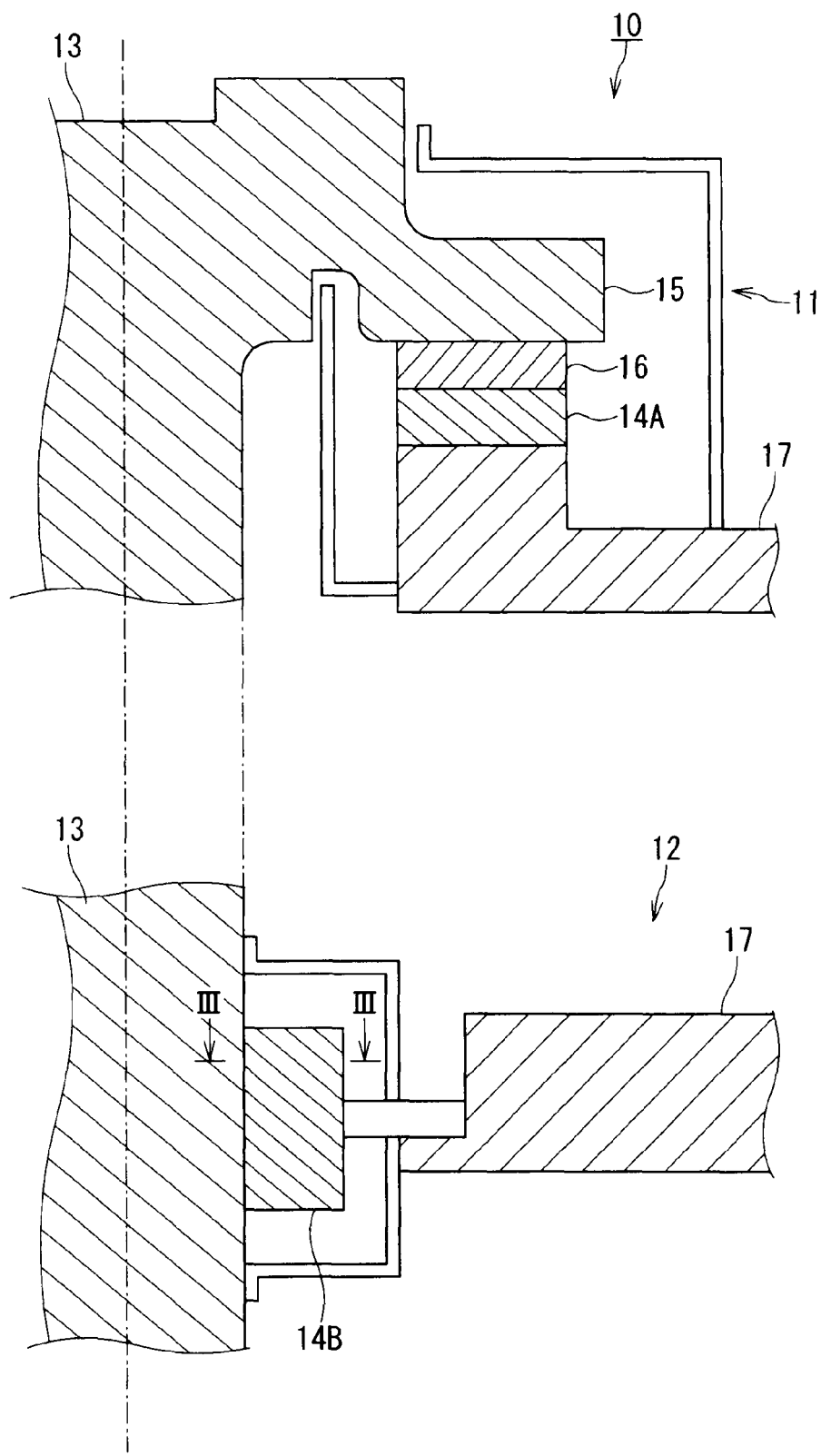
FIG. 1 is a half sectional view of a bearing assembly formed from a sliding member made of a sliding material according to a first embodiment of the present invention.
Figures 2A, 2B:
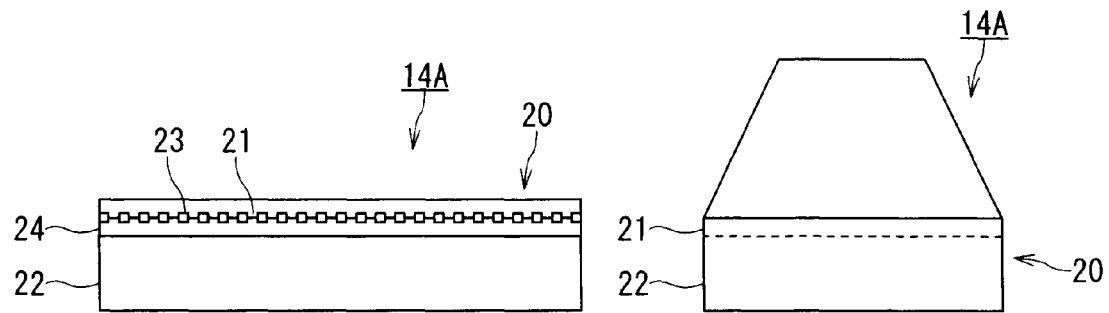
Figure 3:
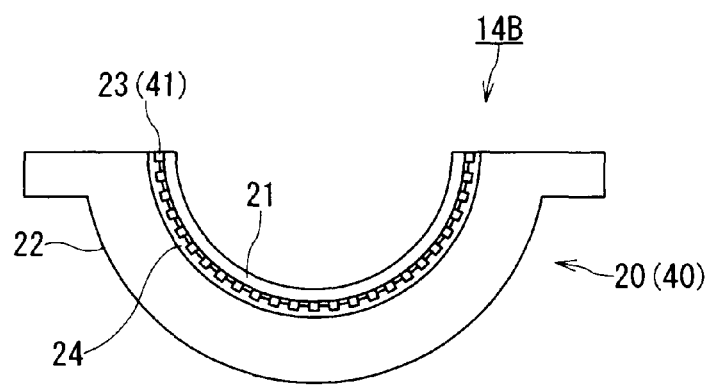
FIG. 3 is a sectional view of a guide bearing member taken along the line III-III of FIG. 1.

With reference to FIGS. 1 to 3, a bearing assembly 10 shown in FIG. 1 is applied to a hydraulic turbine generator, for example, and supports a rotational shaft 13 with a thrust bearing member 11 and a guide bearing member (may be referred to a journal bearing device) 12. The thrust bearing member 11 is configured by radially arranging a plurality of sliding members 14A around the rotational shaft 13. Each sliding member 14A, as shown in FIG. 2A, has substantially fan (sector)-shape. The thrust bearing member 11, as shown in FIG. 1, slidably supports a thrust load in an axial direction of the rotational shaft 13, which is the total sum of the weight of the rotational shaft 13 and a hydraulic thrust applied to a water wheel during operation, for example, with the sliding members 14A via a thrust collar 15 and a thrust runner 16 that are fixed to the rotational shaft 13.

Figure 4:
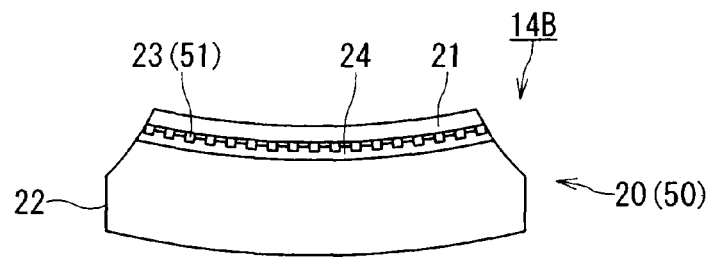
FIG. 4 is a sectional view showing another example of the sliding member in the guide bearing member of FIG. 1.

On the other hand, the guide bearing member 12 is configured by cylindrically arranging a plurality of sliding members 14B to be held in slidable contact with the rotational shaft 13. The guide bearing member 12 slidably supports the shaft vibration of the rotational shaft 13 in the rotational direction with the sliding members 14B. The sliding member 14B may be a two-divided segment from the guide bearing member 12 as shown in FIG. 3, or an eight-divided segment from the guide bearing member 12 as shown in FIG. 4. Reference numeral 17 in FIG. 1 denotes a support member.

Figure 5:
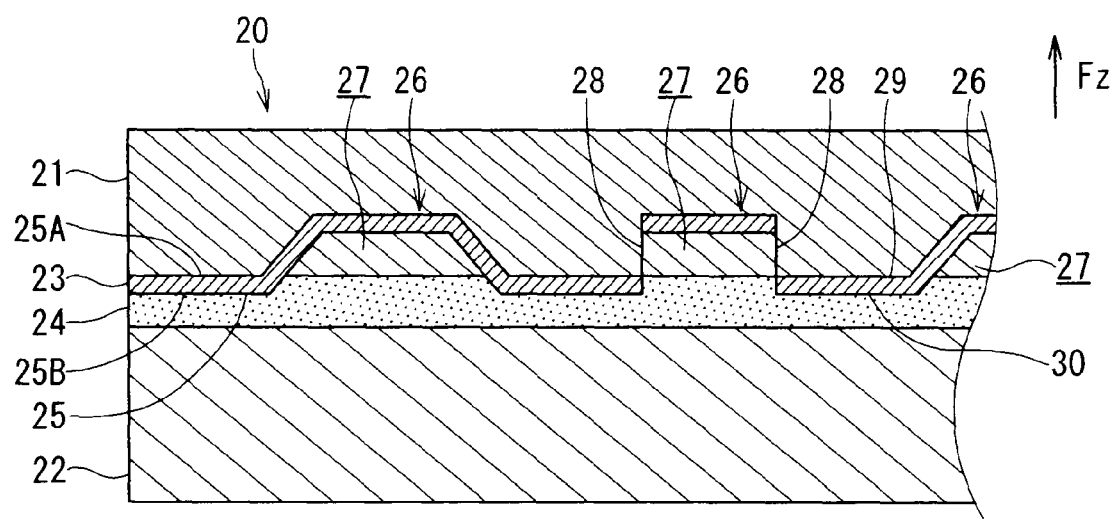
FIG. 5 is a sectional view of the sliding material for making the sliding member shown in FIGS. 2 to 4.

The above-mentioned sliding members 14A and 14B are produced of a sliding material 20 shown in FIG. 5. The sliding material 20 is made by joining a sliding plane member 21 to a base member 22 different, in substance, from the sliding plane member 21 with an intermediate member 23 and a joining member 24 being interposed.

The sliding plane member 21 is made of a polytetrafluoroethylene (PTFE) resin material, a polyetheretherketone (PEEK) resin material, a polyimide (PI) resin material, or a composite material made by adding ceramic fibers or particle fillers to any one of these resins. The polytetrafluoroethylene resin material has a low frictional coefficient and is excellent in heat resistance. The polyetheretherketone resin material and the polyimide resin material are excellent in mechanical properties at high temperature though they have a rather higher frictional coefficient in comparison with the PTFE resin material. Furthermore, the composite material is excellent in both frictional and wearing characteristics and mechanical properties.

The base member 22 is made of various metallic materials, such as iron, and in particular, steel, such as carbon steel for machine structural use (S45C), is preferable. The base member 22 serves as a member having high strength for bearing a high load applied to the sliding material 20.

The intermediate member 23 is a plate-like component 25 made of a metallic material, such as iron, copper, and aluminum, and arranged between the sliding plane member 21 and the base member 22. When the intermediate member 23 is made of iron, manufacturing cost will be reduced, and in case of copper, the intermediate member 23 is excellent in bondability between the sliding plane member 21 and the joining member 24. The thickness of the intermediate member 23 is appropriately set in accordance with that of the sliding plane member 21, and when the thickness of the sliding plane member 21 is 2 to 3 mm, for example, it may be set at about 1 to 2 mm.

The intermediate member 23, as shown in FIGS. 6A to 6E, includes a plurality of convex protrusions 26 protruded from at least one of the top surface 25A and the bottom surface 25B of the component 25. According to the embodiment, the top surface 25A is provided with a plurality of the convex protrusions 26 protruded therefrom. The protrusion 26 is provided with a space 27 formed therein (see FIGS. 6B to 6E).

The protrusion 26 is formed in a rectangular shape to linearly extend in a plan view, and both ends thereof are integrated with the component member 25. Furthermore, the protrusion 26 is provided with openings 28 formed in a lower portion in a direction perpendicular to the extending direction of the protrusion 26. The openings 28 are formed so as to oppose to each other and to communicate the top surface 25A with the bottom surface 25B of the component 25.

Figure 6A:
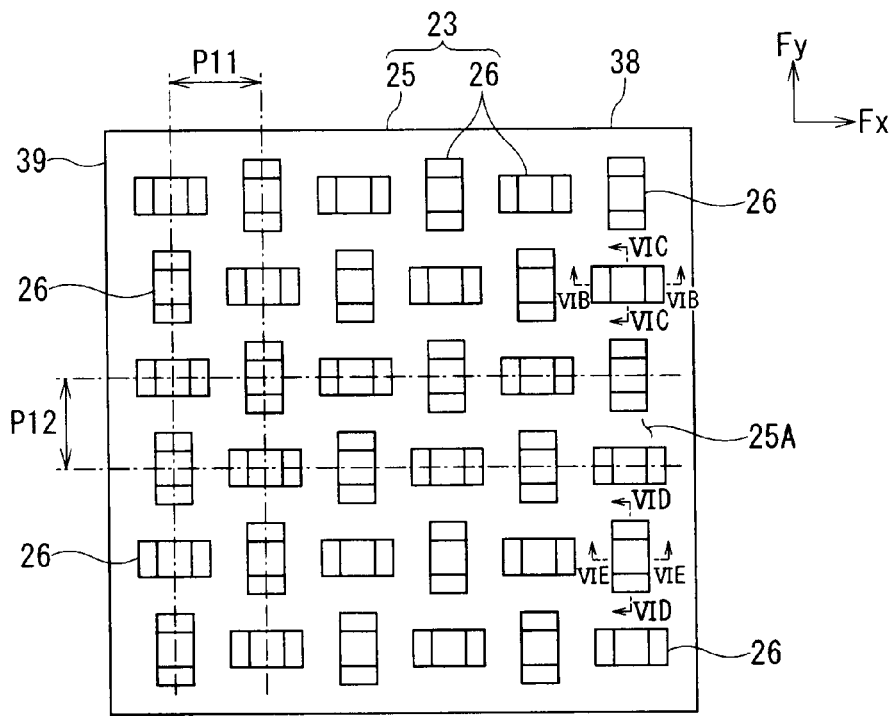
Figure 6B:
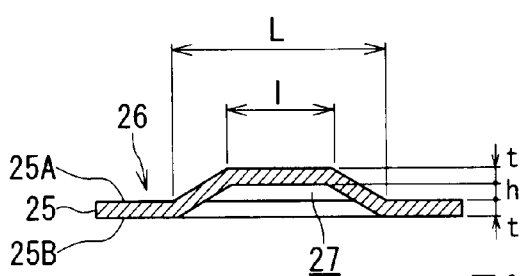
Figure 6C:
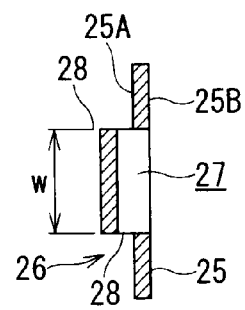
Figure 6D:
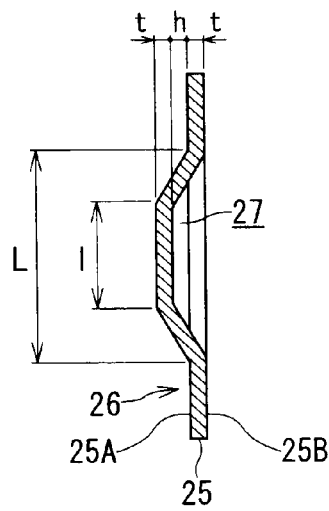
Figure 6E:
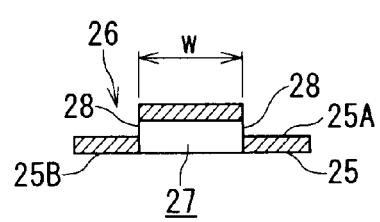

A plurality of such protrusions 26, as shown in FIG. 6A, are linearly arranged on the top surface 25A of the component member 25 in a direction along one side 38 of the component member 25 at intervals of pitch P11 with each direction changed alternately at the right angle while being arranged in a direction along the other side 39 of the component member 25 perpendicular to the side 38 at intervals of pitch P12. In view of lateral or longitudinal protrusions 26, the lateral protrusions 26 are arranged on the top surface 25A of the component member 25 in a staggered arrangement stretching over one line, while a plurality of the longitudinal protrusions 26 are also arranged on the top surface 25A of the component member 25 in a staggered arrangement stretching over one line.

The intermediate member 23 having the protrusions 26 and the openings 28 formed on the component member 25 is fabricated by a punching press method, an emboss processing, a burring method, a louver processing, a cutting method, or a method similar to these methods (an etching method, for example). Since the thickness of the component member 25 is as small as several millimeters in the fabricating, a number of the intermediate members 23 can be fabricated by one-time processing, so that the manufacturing is not limited by the capacity of a processing machine.

The joining member 24 shown in FIG. 5 is for bonding between the intermediate member 23 and the base member 22 and made of a metallic material of Sn with a melting point or a melting temperature lower than that of the sliding plane member 21. Specifically, the melting point of the Sn alloy that is the metallic material of Sn is 232° C. or less, which is lower than the fusion temperature of about 375° C. of the polytetrafluoroethylene (PTFE) resin material, the melting point of about 343° C. of the polyetheretherketone (PEEK) resin material, and the melting point of about 388° C. of the polyimide (PI) resin material, which constitute the sliding plane member 21. Hence, even when the joining member 24 made of the Sn alloy is melted at about its melting point (232° C.), the sliding plane member 21 cannot be damaged or deteriorated.

The metallic material of Sn forming the joining member 24 includes at least one element of Pb, Cu, Ag, Bi, Zn, Fe, Co, Ti, Ta, V, Pd, and Ge. The joining member 24 controls wettability of the joining interface between the iron or copper material of the intermediate member 23 and the iron material of the base member 22, and also controls the size and distribution of the chemical compound between metals produced by an interface reaction, for improving mechanical properties, fatigue resistance characteristics, and anti-oxidation characteristics of the Sn alloy.

Furthermore, for reducing surface tensions, it is preferable to include at least one of elements of such as Pb, Cu, Ag, Bi, Zn, Fe, Co, Ti, Ta, V, Pd, and Ge. However, in recent view of reduction in environmental loading, Pb may be omitted. Although the content of the additional element is not specifically limited, if the content is excessive, the compound between metals may be formed to reduce mechanical properties, so that the content is preferably selected to a value in the vicinity of the eutectic composition of the Sn alloy.

In the sliding material 20, as shown in FIG. 5, when the sliding plane member 21 is bonded on the base member 22, the space 27 of the intermediate member 23 is impregnated with portions of the respective sliding plane member 21 and the joining member 24. Namely, an upper half portion of the space 27 in the protrusion 26 of the intermediate member 23 is impregnated with a portion of the sliding plane member 21 via the openings 28, so that the sliding plane member 21 is bonded to the intermediate member 23 and is deposited on the top surface 25A of the component member 25 in the intermediate member 23.

Furthermore, residual portion (i.e., lower half portion) of the space 27 of the intermediate member 23 is impregnated with a portion of the joining member 24, so that the base member 22 is bonded to the intermediate member 23 with the joining member 24 therebetween. In such a manner, the sliding plane member 21 and the base member 22, which are different materials from each other, are bonded together by using the intermediate member 23 and the joining member 24.

The space 27 of the intermediate member 23 is impregnated with portions of the respective sliding plane member 21 and the joining member 24, so that the intermediate member 23 has a reacting force based on a wedge effect against a force in a direction peeling or breaking the sliding plane member 21 and the joining member 24 off or from the intermediate member 23. That is, the intermediate member 23 has a reacting force based on a wedge effect against forces $F_x$ and $F_y$ (FIG. 6), which are parallel with a joining interface 29 between the sliding plane member 21 and the intermediate member 23 and a joining interface 30 between the intermediate member 23 and the component member 25, respectively, and a perpendicular force $F_z$ (FIG. 5). Due to this reacting force, the bonding strength between the sliding plane member 21 and the base member 22 is increased. The parallel forces $F_x$ and $F_y$ are perpendicular to each other on the plane parallel with the joining interface 29 and the joining interface 30.

Hereunder, the method of manufacturing the sliding material 20 performed as described above will be described with reference to FIGS. 7A to 7G.

First, the intermediate member 23 is placed in a molding die 31 (FIG. 7A). Then, fine particles 32 of the sliding plane member 21 are supplied to the molding die 31 and deposited on the surface 25A of the intermediate member 23 (FIG. 7B). Next, while the space 27 of the intermediate member 23 is impregnated with the fine particles 32 of the sliding plane member 21, the sliding plane member 21 is stuck on the surface 25A of the intermediate member 23 so as to form a molded body 33 (FIG. 7C). Thereafter, the molded body 33 is sintered to form a junction body 34 between the sliding plane member 21 and the intermediate member 23 (FIG. 7D).

After forming the junction body 34 between the sliding plane member 21 and the intermediate member 23, the sheet-like joining member 24 is firstly placed on the surface of the base member 22 (FIG. 7E). Instead of this placing, the joining member 24 may be formed on the surface of the base member 22 by a clad metal rolling method, a fusion dipping method, a thermal spraying method, or a vacuum deposition method. Alternatively, fine particles of the joining member 24 may be formed on the surface of the base member 22 by a coating method or a printing method. In such a manner, by preliminarily forming the joining member 24 on the surface of the base member 22, the operability of the succeeding manufacturing process may be improved.

Then, the junction body 34 of the sliding plane member 21 and the intermediate member 23, shown in FIG. 7D, is placed on the joining member 24 formed and placed on the surface of the base member 22, and the intermediate member 23 is then brought into contact with the joining member 24 (FIG. 7F). Thereafter, the space 27 of the intermediate member 23 of the junction body 34 is being impregnated with the joining member 24 by heating the joining member 24 to a melting point thereof, and the intermediate member 23 of the junction body 34 is bonded to the base member 22 with the joining member 24 to make the sliding material 20 (FIG. 7G).

In the manufacturing process described above, the processes from the process shown in FIG. 7A to the process shown in FIG. 7D for manufacturing the junction body 34 of the sliding plane member 21 and the intermediate member 23 may be replaced with processes shown in FIGS. 8A to 8D.

That is, first, the intermediate member 23 is placed in the molding die 31 (FIG. 8A). Then, solid material of the sliding plane member 21 is supplied in the molding die 31 and stuck on the surface 25A of the intermediate member 23 (FIG. 8B). Then, the sliding plane member 21 is heated within the molding die 31 for melting the same (FIG. 8C). Thereafter, while the space 27 of the intermediate member 23 is being impregnated with the melt sliding plane member 21, the sliding plane member 21 is deposited on the surface 25A of the intermediate member 23 so as to mold the junction body 34 of the sliding plane member 21 and the intermediate member 23 through a press molding method or an injection molding method (FIG. 8D).

Although the manufacturing processes of FIGS. 7A to 7D may be preferable when the sliding plane member 21 is made of the polytetrafluoroethylene (PTFE) resin material, for example, the manufacturing processes of FIGS. 8A to 8D may be preferable when the sliding plane member 21 is made of the polyetheretherketone (PEEK) resin material or the polyimide (PI) resin material, for example.

Figure 9A:
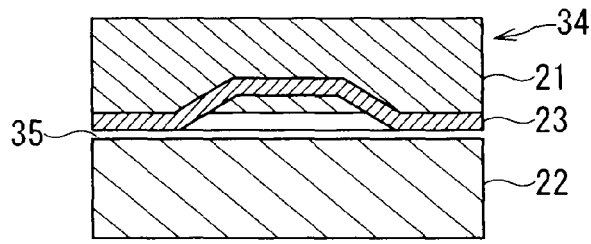
FIGS. 9A to 9C are illustrations showing still another example of the manufacturing processes of the sliding material of FIG. 5.
Figure 9B:
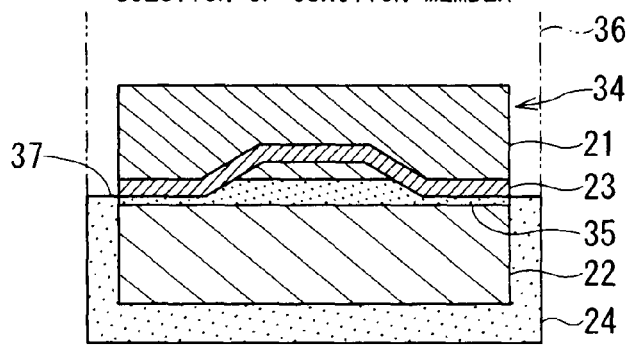
Figure 9C:
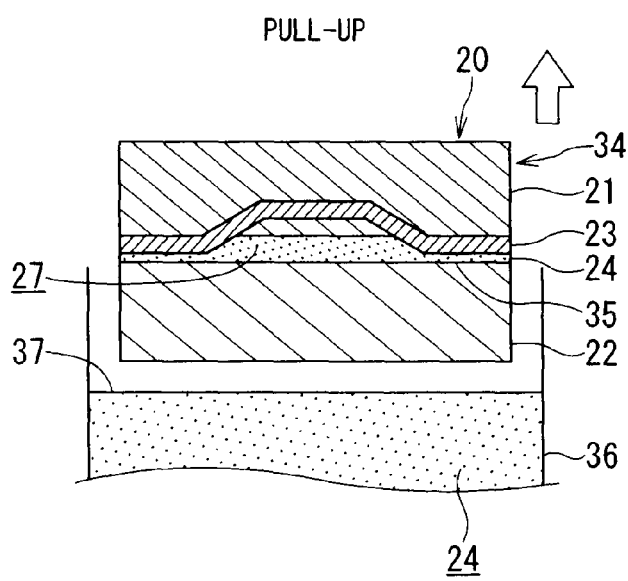

In the manufacturing processes of the sliding material 20 shown in FIGS. 7E to 7G, the processes from producing the junction body 34 of the sliding plane member 21 and the intermediate member 23 to the manufacturing of the sliding material 20 may be replaced with the processes shown in FIGS. 9A to 9C.

That is, after producing the junction body 34 of the intermediate member 23 and the sliding plane member 21, the junction body 34 is firstly placed on the surface of the base member 22 with a spacer, not shown, interposed therebetween (FIG. 9A). At this time, between the intermediate member 23 of the junction body 34 and the base member 22, a clearance 35 is formed with the spacer.

Then, the base member 22 with the junction body 34 is dipped into molten liquid of the joining member 24 in a liquid tank 36 (FIG. 9B). At this time, a liquid level of the joining member 24 is adjusted not to reach the sliding plane member 21. In this state, the molten liquid of the joining member 24 infiltrates the clearance 35 between the intermediate member 23 of the junction body 34 and the base member 22.

Thereafter, the junction body 34 of the sliding plane member 21 and the intermediate member 23, and the base member 22 are pulled out of the molten liquid of the joining member 24 (FIG. 9C). Then, the joining member 24 infiltrated into the clearance 35 between the intermediate member 23 of the junction body 34 and the base member 22 is cooled, and in a state of the joining member 24 impregnated into the space 27 of the intermediate member 23, the intermediate member 23 of the junction body 34 is bonded to the base member 22, thereby forming the sliding material 20.

According to the embodiment mentioned above, the following advantageous effects (1) to (3) will be attained.

(1) An upper portion (upper half) of the space 27 of the intermediate member 23 is impregnated with the sliding plane member 21, so that the sliding plane member 21 is bonded to the intermediate member 23. The residual portion (lower half) of the space 27 of the intermediate member 23 is impregnated with the joining member 24, so that the base member 22 is bonded to the intermediate member 23 via the joining member 24, and the sliding plane member 21 is integrally bonded to the base member 22. Hence, the intermediate member 23 has a reacting force against a force in a direction peeling off or breaking the sliding plane member 21 and the joining member 24 from the intermediate member 23, which is a resultant force of forces $F_x$ and $F_y$, which are parallel with the joining interface 29 between the sliding plane member 21 and the intermediate member 23 and the joining interface 30 between the intermediate member 23 and the joining member 24, respectively, and a perpendicular force $F_z$.

As a result, the bonding strength between the sliding plane member 21 and the base member 22, which are different from each other, can be improved, thus increasing the reliability of the sliding material 20. Furthermore, since the sliding plane member 21 has preferred frictional and wearing characteristics, the sliding performance of the sliding material 20 can be improved.

(2) In the bonding between the sliding plane member 21 and the intermediate member 23 due to the impregnation therebetween and via the joining member 24, any vacuum equipment is not required, and even when the base member 22 has a large weight, for example, the manufacturing is not dependent on the equipment capacity, so that the sliding material 20 can be made by reducing the manufacturing cost.

(3) The sliding material 20 for use in the thrust bearing member 11 or the guide bearing member 12 is excellent in sliding performance and reliability, is not dependent on the equipment capacity, and can reduce the manufacturing cost, so that the bearing assembly 10 equipped with both the thrust bearing member 11 and guide bearing member 12 is also excellent in the sliding performance and reliability without dependent on the equipment capacity, and can also reduce the manufacturing cost.

Figure 10:
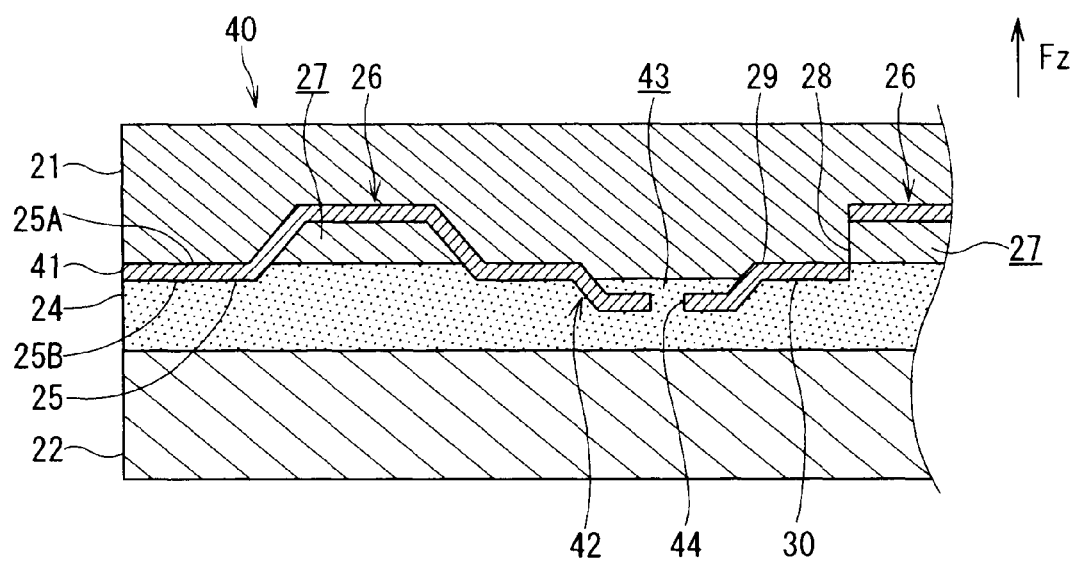
FIG. 10 is a sectional view of a second embodiment of the sliding material according to the present invention.
Figure 11A:
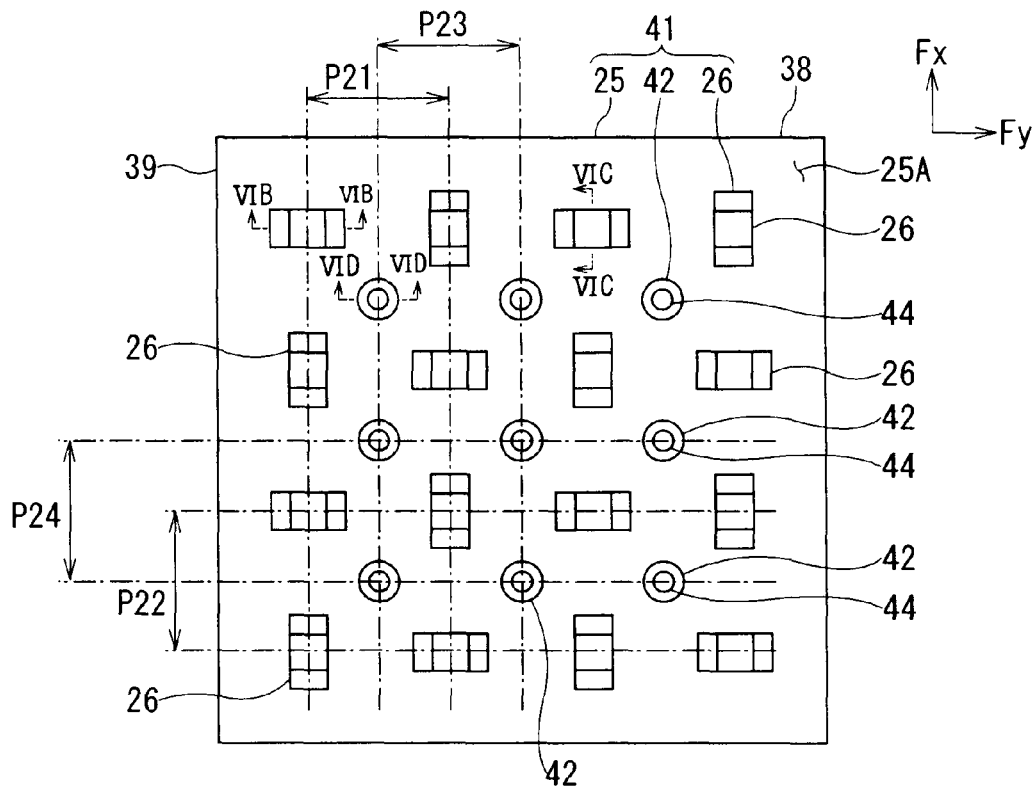
Figure 11B:
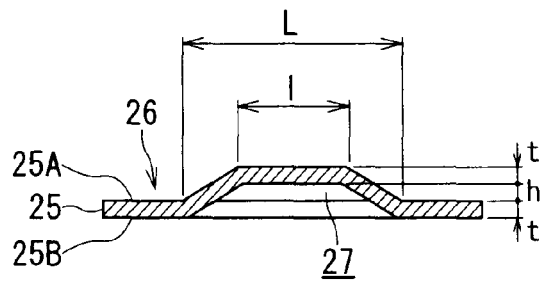
Figure 11C:
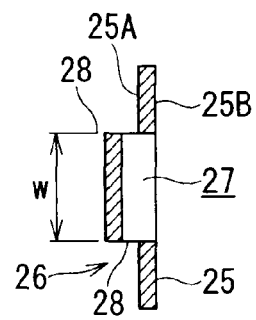
Figure 11D:
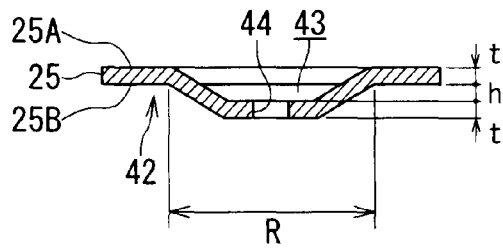

Second Embodiment (FIGS. 10 to 11D)

FIG. 10 is a sectional view of a sliding material according to a second embodiment of the present invention. In the second embodiment, like reference characters designate like components common to the first embodiment, and the description is simplified or omitted herein.

A point of a sliding material 40 according to this second embodiment differs from the sliding material 20 according to the first embodiment in the shape and the arrangement of protrusions in an intermediate member 41.

That is, as shown in FIGS. 11A to 11D, a plurality of the rectangular protrusions 26 are linearly arranged on the surface 25A of the component member 25 of the intermediate member 41 in a direction along the side 38 of the component member 25 at an interval of the pitch P21 such that the protrusions 26 are arranged by changing their arranging directions alternately at the right angle while being arranged in a direction along the other side 39 of the component member 25 at an interval of the pitch P22. The protrusion 26 is provided with the space 27 formed therein.

Furthermore, the protrusion 26 is provided with the openings 28 formed in the lower portion so as to oppose to each other and to communicate the surface 25A with the bottom surface 25B of the component member 25.

On the bottom surface 25B of the component member 25 of the intermediate member 41, a plurality of circularly convex protrusions 42 are also formed, their peripheries being integrated with the component member 25. The plurality of the protrusions 42 are arranged on the bottom surface 25B of the component member 25 in a direction along the side 38 of the component member 25 at an intervals of pitch P23, at positions different from those corresponding to the protrusions 26, while being arranged in a direction along the other side 39 of the component member 25 at an interval of pitch P24.

The protrusion 42 is provided with a space 43 formed therein, and each protrusion 42 is provided with an opening 44 formed at the most projected position of the protrusion 42 so as to communicate the surface 25A with the bottom surface 25B of the component member 25.

In the sliding material 40, as shown in FIG. 10, when the sliding plane member 21 is bonded on the base member 22, the spaces 27 and 43 of the intermediate member 41 are impregnated with a portion of the respective sliding plane member 21 and the joining member 24. That is, the portion (upper half of the space 27 in the protrusion 26 of the intermediate member 41 is impregnated with a portion of the sliding plane member 21 via the openings 28, while the portion (upper half of the space 43 of the protrusion 42 is impregnated with a portion of the sliding plane member 21, so that the sliding plane member 21 is bonded to the intermediate member 41, and is deposited on the surface 25A of the component member 25 in the intermediate member 41.

Furthermore, the residual portion (lower half of the space 27 of the protrusion 26 of the intermediate member 41 is impregnated with a portion of the joining member 24, while the residual portion (lower half of the space 43 of the protrusion 42 is impregnated with a portion of the joining member 24 via the opening 44, so that the base member 22 is bonded to the intermediate member 41 via the joining member 24.

The intermediate member 41 is herein fabricated by the punching press method, etc., in the same way as in the intermediate member 23. The sliding material 40 is also made by the same process as that of the sliding material 20 using the sliding plane member 21, the base member 22, the intermediate member 41, and the joining member 24. Furthermore, using this sliding material 40, the thrust bearing member 11 and the guide bearing member 12 are manufactured.

Accordingly, the sliding material of this embodiment attains the following effect (4) as well as the effects (1) to (3) mentioned with reference to the first embodiment.

(4) The intermediate member 41 is provided with the circular protrusions 42 formed on the bottom surface 25B of the component member 25, and the space 43 formed inside the protrusion 42 is impregnated with at least one of the sliding plane member 21 and the joining member 24. Thus, by the sliding plane member 21 or the joining member 24 within the space 43, the intermediate member 41 has a reacting force against a force in a direction peeling or breaking the sliding plane member 21 and the joining member 24 off the intermediate member 41, which is a resultant force of forces $F_x$ and $F_y$ (FIGS. 11A to 11D), which are parallel with the joining interface 29 between the sliding plane member 21 and the intermediate member 41 and the joining interface 30 between the intermediate member 41 and the joining member 24, respectively, and a perpendicular force $F_z$ (FIG. 10).

That is, the sliding plane member 21 impregnated in the space 27 of the protrusion 26 formed on the surface 25A of the component member 25 can mainly take the partial burden of the bonding strength between the component member 25 and the sliding plane member 21 while the joining member 24 impregnated in the space 43 inside the circular protrusion 42 on the bottom surface 25B of the component member 25 can mainly take the partial burden of the bonding strength between the component member 25 and the joining member 24.

Therefore, in the sliding material 40 according to the embodiment, in comparison with the sliding material 20 of the first embodiment in which the space 27 inside the protrusion 26 formed only on the top surface 25A of the component member 25 is impregnated with the sliding plane member 21 and the joining member 24, the area of the joining interface 30 between the intermediate member 41 and the joining member 24 is especially increased by the area of the circular protrusions 42, so that the bonding strength between the sliding plane member 21 and the base member 22 can be increased more firmly, further improving the reliability of the sliding material 40.

Figure 12:
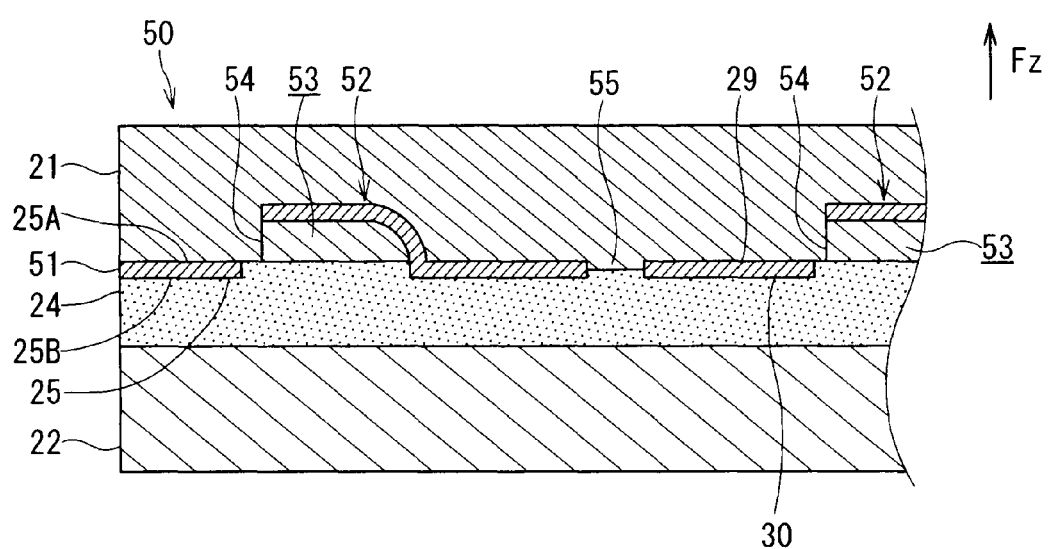
FIG. 12 is a sectional view of a third embodiment of the sliding material according to the present invention.
Figure 13A:
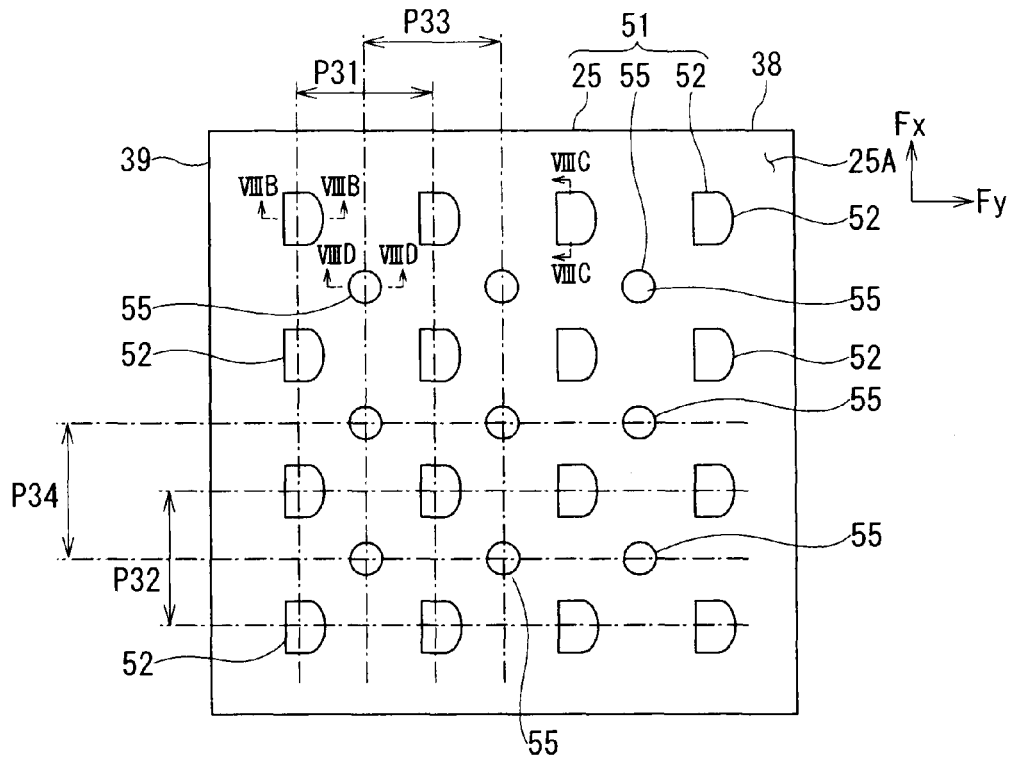
Figure 13B:
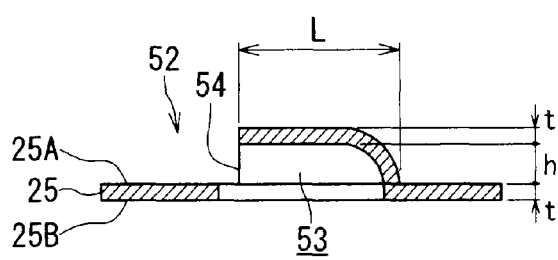
Figure 13C:
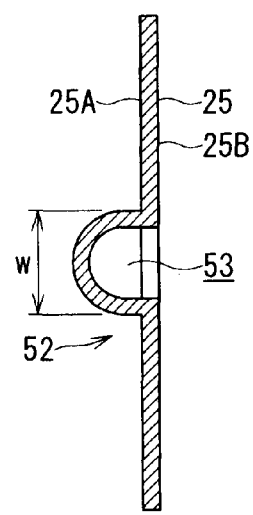
Figure 13D:
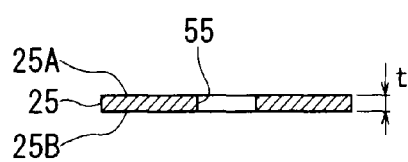

Third Embodiment (FIGS. 12 to 13D)

FIG. 12 is a sectional view of a sliding material according to a third embodiment of the present invention, in which like reference characters designate like components common to the first embodiment, and the description is simplified or omitted herein.

A sliding material 50 according to this third embodiment differs from the sliding material 20 according to the first embodiment in the shape and the arrangement of protrusions in an intermediate member 51.

That is, as shown in FIGS. 13A to 13D, a plurality of half-oval convex protrusions 52 are linearly arranged on the surface 25A of the component member 25 of the intermediate member 51 in a direction along the side 38 of the component member 25 at an interval of a pitch P31 while being arranged in a direction along the other side 39 of the component member 25 at an interval of a pitch P32. The protrusion 52 is provided with a space 53 formed therein. The protrusion 52 is provided with an opening 54 formed in the same direction as that of the component member 25 so that the opening is integrated at its one end with the component member 25 and communicates the top surface 25A with the bottom surface 25B at its other end.

Furthermore, on the component member 25 of the intermediate member 51, through-holes 55 are also formed to pass through the component member 25. A plurality of the through-holes 55 are linearly arranged in a direction along the side 38 of the component member 25 at an interval of a pitch P33, at positions different from those corresponding to the protrusions 52, while being arranged in a direction along the other side 39 of the component member 25 at an interval of a pitch P34.

In the sliding material 50, as shown in FIG. 12, when the sliding plane member 21 is bonded onto the base member 22, the space 53 in the protrusion 52 and the through-hole 55 of the intermediate member 51 are impregnated with portions of the respective sliding plane member 21 and the joining member 24. That is, a portion (upper half of the space 53 in the protrusion 52 of the intermediate member 51 is impregnated with a portion of the sliding plane member 21 through the opening 54, while a portion of the through-hole 55 is impregnated with a portion of the sliding plane member 21, so that the sliding plane member 21 is bonded to the intermediate member 51, and is deposited on the top surface 25A of the component member 25 in the intermediate member 51. Furthermore, the residual portion (lower half) of the space 53 in the protrusion 52 of the intermediate member 51 is impregnated with a portion of the joining member 24, while the residual portion of the through-hole 55 is impregnated with a portion of the joining member 24, so that the base member 22 is bonded to the intermediate member 51 through the joining member 24.

The intermediate member 51 is fabricated by the punching press method, etc., in the same way as in the intermediate member 23. The sliding material 50 is also made through the same process as that of the sliding material 20 using the sliding plane member 21, the base member 22, the intermediate member 51, and the joining member 24. Further, the thrust bearing member 11 and the guide bearing member 12 are manufactured by using this sliding material 50.

According to this third embodiment, the space 53 in the protrusion 52 and the through-hole 55 of the intermediate member 51 are impregnated with portions of the respective sliding plane member 21 and the joining member 24, and the sliding material 50 attains the following effect as well as the effects (1) to (3) attained by the first embodiment.

That is, since the protrusions 52 on the component member 25 are formed in the same direction, against a load in a direction toward the opening 54 (+$F_y$ direction in FIGS. 13A to 13D), the strength is increased more than a strength to the load in the different directions. Hence, the sliding material 50 is effective for instruments in which the load direction is preliminarily known.

Figure 14A:
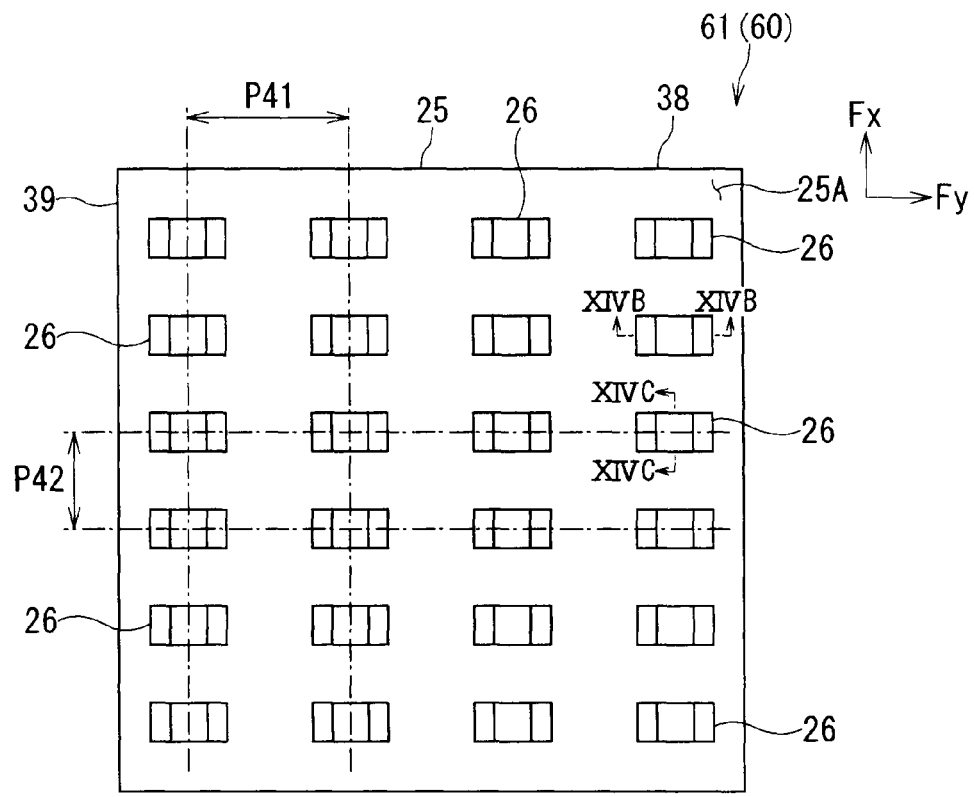
Figure 14B:
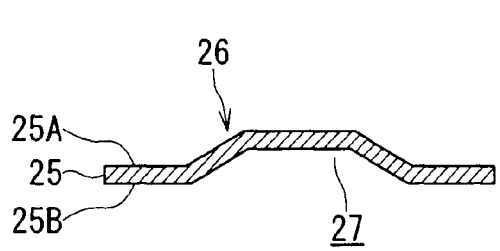
Figure 14C:
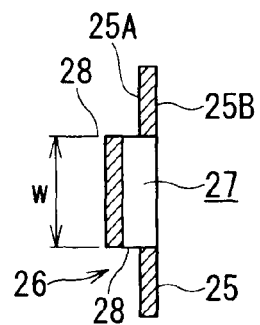

Fourth Embodiment (FIGS. 14A to 14C)

FIGS. 14A to 14C represent an intermediate member of a sliding material according to a fourth embodiment of the present invention, in which FIG. 14A is a plan view and FIGS. 14B and 14C are sectional views taken along the lines XIVB-XIVB and XIVC-XIVC of FIG. 14A, respectively. According to the fourth embodiment, like reference characters designate like components common to the first embodiment, and the description is simplified or omitted herein.

A sliding material 60 according to this fourth embodiment differs from the sliding material 20 of the first embodiment in arrangement of the protrusions in an intermediate member 61.

That is, a plurality of rectangular protrusions 26 are laterally and linearly arranged on the top surface 25A of the component member 25 of the intermediate member 61 in a direction along the side 38 of the component member 25 at a interval of a pitch P41 while being arranged in a direction along the other side 39 of the component member 25 at an interval of a pitch P42. The protrusion 26 is provided with the space 27 formed therein and the openings 28 formed in lower portions so as to oppose to each other. These protrusions 26 may not be linearly arranged in a direction along the side 38 but may be arranged in a staggered alignment.

In the sliding material 60, in the same way as in the sliding material 20 of the first embodiment, when the sliding plane member 21 is bonded onto the base member 22, a portion (upper half) of the space 27 in the protrusion 26 of the intermediate member 61 is impregnated with the sliding plane member 21 through the openings 28, while the residual portion (lower half) of the space 27 is impregnated with the joining member 24.

The intermediate member 61 is fabricated by the punching press method, etc., in the same way as in the intermediate member 23. The sliding material 60 is also made through the same process as that of the sliding material 20 using the sliding plane member 21, the base member 22, the intermediate member 61, and the joining member 24. Further, the thrust bearing member 11 and the guide bearing member 12 are manufactured by using this sliding material 60.

According to this fourth embodiment, the sliding material 60 also attains the following effect as well as the effects (1) to (3) according to the first embodiment.

That is, since the opening 28 below the protrusion 26 is directed in one direction (the $F_x$ direction in FIGS. 14A to 14C), against a load in the direction perpendicular to the one direction (the $F_y$ direction in FIGS. 14A to 14C), the strength is increased more than a strength to the load in the different directions. Hence, the sliding material 60 is effective for instruments in which the load direction is preliminarily known. In addition, the intermediate member 61 includes the simple protrusions 26 directed in one direction, so that the sliding material 60 has such an effect that the fabrication cost by the pressing is inexpensive lower than that according to the first to third embodiments.

Figure 15A:
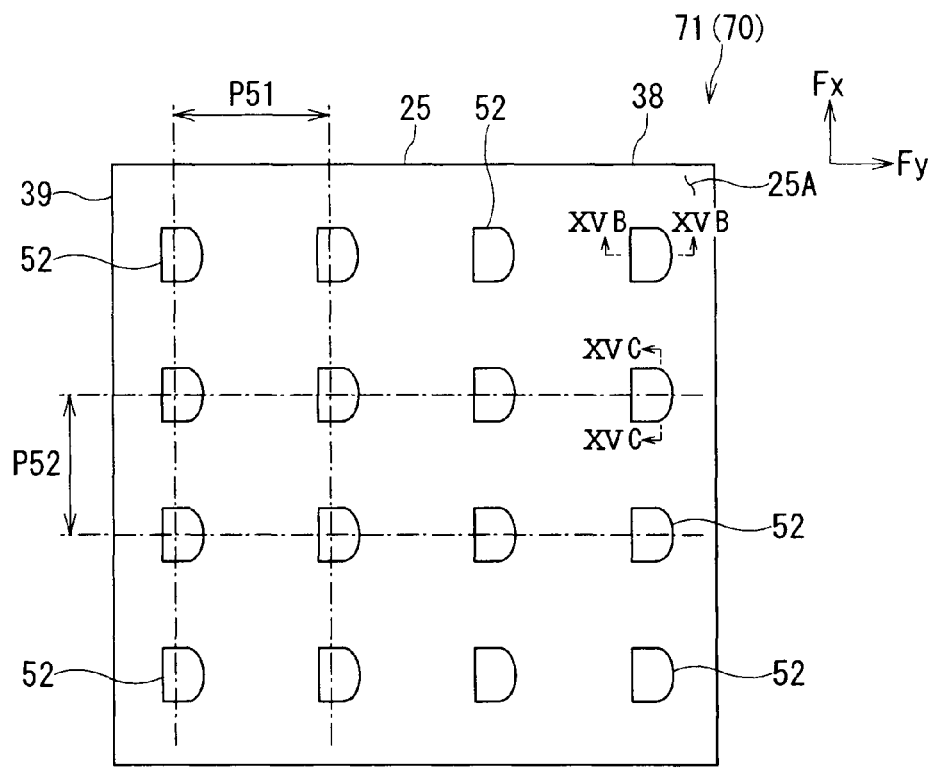
Figure 15B:
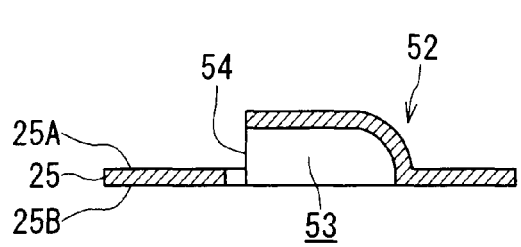
Figure 15C:
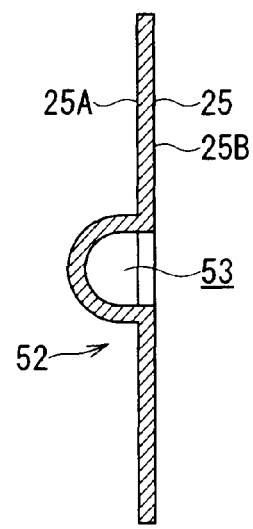

Fifth Embodiment (FIGS. 15A to 15C)

FIGS. 15A to 15C represent an intermediate member of a sliding material according to a fifth embodiment of the present invention, in which FIG. 15A is a plan view and FIGS. 15B and 15C are sectional views taken along the lines XVB-XVB and XVC-XVC of FIG. 15A, respectively, in which like reference characters designate like components common to the first to third embodiments, and the description is simplified or omitted herein.

A sliding material 70 according to this fifth embodiment differs from the sliding material 50 of the third embodiment in the configuration of an intermediate member 71.

That is, in the intermediate member 71, the through-hole 55 is not formed on the component member 25, and a plurality of the half-oval protrusions 52 are linearly arranged on the top surface 25A of the component member 25 in a direction along the side 38 of the component member 25 at an intervals of a pitch P51 while being arranged in a direction along the other side 39 of the component member 25 at an interval of a pitch P52. The protrusion 52 is provided with the space 53 formed therein and the opening 54 formed in the same direction as that of the component member 25. These protrusions 52 may not be linearly arranged in a direction along the side 38 of the component member 25 but may also be arranged in a staggered alignment.

In the sliding material 70, in the same way as in the sliding material 50 of the third embodiment, when the sliding plane member 21 is bonded on the base member 22, a portion (upper half of the space 53 in the protrusion 52 of the intermediate member 71 is impregnated with the sliding plane member 21 through the opening 54, while the residual portion (lower half of the space 53 is impregnated with the joining member 24.

The intermediate member 71 is fabricated by the punching press method, etc., in the same way as in the intermediate member 23. The sliding material 70 is also made through the same process as that of the sliding material 20 by using the sliding plane member 21, the base member 22, the intermediate member 71, and the joining member 24. Further, the thrust bearing member 11 and the guide bearing member 12 are manufactured by the sliding material 70.

According to this fifth embodiment, the sliding material 70 also attains the following effect as well as the effects (1) to (3) according to the first embodiment.

That is, since the opening 54 in the protrusion 52 of the component member 25 is directed in one direction, against a load in a direction toward the opening 54 (a load in the $+F_y$ direction in FIGS. 15A to 15C), the bonding strength between the intermediate member 71 and the sliding plane member 21 is increased more than a strength to the load in the different directions. Hence, the sliding material 70 is effective for instruments in which the load direction is preliminarily known. Since a junction interface between the joining member 24 and the space 53 is formed substantially perpendicularly to the load direction (i.e., the $F_y$ direction), the sliding material 70 also attains such an effect that the bonding strength between the intermediate member 71 and the joining member 24 is increased more than a strength according to the fourth embodiment in which the junction interface is formed at an acute angle.

Figure 16:
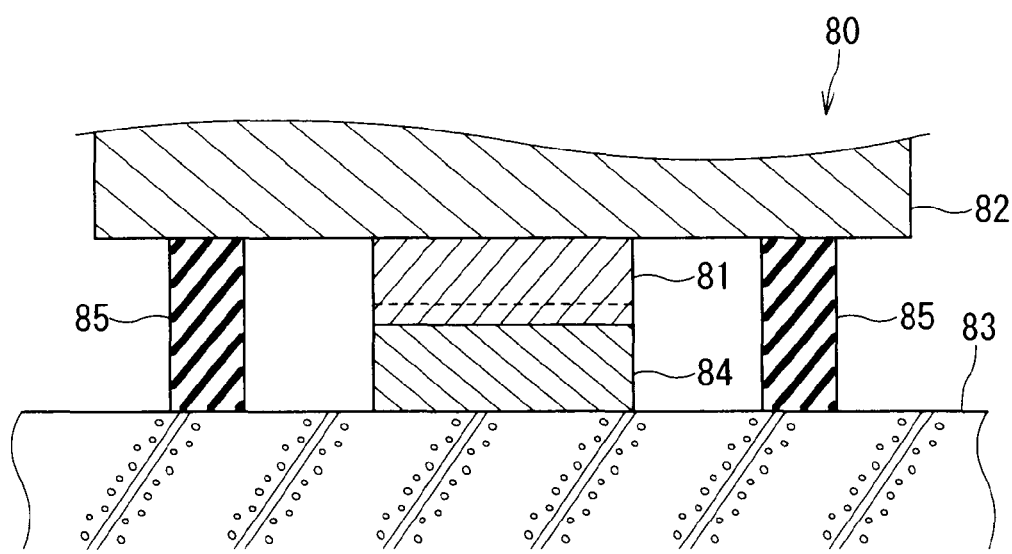
FIG. 16 is a sectional view showing a heavy load support apparatus having the sliding member according to the first to fifth embodiments of the sliding material according to the present invention.

Although the present invention has been described above by exemplifying the various embodiments, the invention is not limited to these embodiments. For example, according to the first to fifth embodiments, the sliding materials 20, 40, 50, 60 and 70 have been incorporated in the sliding members 14A and 14B of the thrust bearing member 11 and the guide bearing member 12, but they may also be applied to a sliding member 81 of a heavy load support device 80 shown in FIG. 16. In the heavy load support device 80, under any one of architecture 82, such as a heavy-load building and a bridge beam and foundation 83, under the architecture 82, for example, the sliding member 81 is arranged while a steel base 84 is arranged on the other foundation 83, so that the sliding member 81 slidably comes in contact with the base 84. The architecture 82 is supported by the base 84 of the foundation 83 via the sliding member 81 so that the deformation, such as stretching/shrinking due to changes in temperature, may be permitted. Between the architecture 82 and the foundation 83, a quake-free device 85 may be arranged for absorbing the sliding.

Hereunder, specific examples of the present invention will be described.

Example 1

First, as shown in FIGS. 6A to 6E, the intermediate member 23 was fabricated by linearly arranging the rectangular protrusions 26 (width w=3 mm, total length L=6 mm, parallel part length l=3 mm, overhung height h=0.8 mm) on the top surface 25A of the component member 25 (thickness t=0.8 mm, width 300 mm, length 300 mm, made of a cold rolling steel plate) at an interval of pitch P11=7.5 mm with each direction changed alternately at the right angle while perpendicularly arranging them at an interval of pitch P12=7.5 mm.

Then, the intermediate member 23 was placed in the molding die 31 (FIGS. 7A to 7D) and the molding die 31 was filled up with powder 32 of a polytetrafluoroethylene resin material forming the sliding plane member 21. Then, while impregnating a portion of the space 27 of the intermediate member 23 with a portion of the polytetrafluoroethylene resin material under a pressure of about 500 kgf/cm$^2$, a polytetrafluoroethylene resin material layer with a thickness of about 3 mm was formed on the intermediate member 23. Thereafter, by burning the layer by heating it at 375° C. for 60 minutes, the junction body 34 was produced by bonding the sliding plane member 21 made of the polytetrafluoroethylene resin material to the intermediate member 23.

Next, on the surface of the base member 22 (thickness 70 mm, width 300 mm, length 350 mm, made of S45C (carbon steel for machine structural use)), a Cu cream solder layer forming the joining member 24 (thickness 150 µm, Sn: 3 wt %, Ag: 0.5 wt %) was formed by a screen printing. Then, the intermediate member 23 having the sliding plane member 21 bonded thereon (the junction body 34) was placed on the joining member 24 to burn the same at 250° C. for 5 minutes in an atmosphere of nitrogen gas, so that the sliding material 20 was made by bonding the base member 22 to the junction body 34.

Then, as shown in FIGS. 2A and 2B, by using ten (10) segments of the sliding members 14A made of the sliding material 20, the thrust bearing member 11 was manufactured and assembled into a generator for verifying the bearing performance and the reliability. The low friction, the wear resistance, and the seizure resistance were confirmed under the conditions of start/stop of the generator, various load changes, and high-bearing stress and high-speed operations. As a result, even in the long-term reliability test on the severe conditions, the peeling and the breaking were not recognized on the junction interface between the sliding plane member 21 and the base member 22, and the bearing damage did not occur.

Example 2

As shown in FIGS. 11A to 11D, the intermediate member 41 was fabricated by linearly arranging the rectangular protrusions 26 (width w=3 mm, total length L=6 mm, parallel part length l=3 mm, overhung height h=0.8 mm) on the top surface 25A of the component member 25 (thickness t=0.6 mm, width 300 mm, length 500 mm, made of a cold rolling steel plate) at an interval of pitch P21=7.5 mm with each direction changed alternately at the right angle while perpendicularly arranging them at an interval of pitch P22=7.5 mm, and furthermore, by linearly arranging circular protrusions 42 (diameter R=6 mm, opening diameter 3 mm, overhung height h=0.6 mm) on the bottom surface 25B of the component member 25 at an interval of pitch P23=7.5 mm while perpendicularly arranging them at an interval of pitch P24=7.5 mm.

Then, the intermediate member 41 was placed in the molding die 31 (FIGS. 7A to 7D) and the molding die 31 was filled with the powder 32 of the polytetrafluoroethylene resin material that is to be the sliding plane member 21. Then, while impregnating portions of the spaces 27 and 43 of the protrusions 26 and 42 in the intermediate member 41 with the polytetrafluoroethylene resin material under a pressure of about 500 kgf/cm$^2$, a polytetrafluoroethylene resin material layer with a thickness of about 3 mm was formed on the intermediate member 41. Thereafter, by burning the layer by heating the same at 375° C. for 60 minutes, the junction body 34 was produced by bonding the sliding plane member 21 made of the polytetrafluoroethylene resin material to the intermediate member 41.

Next, the intermediate member 41 having the sliding plane member 21 bonded thereon (the junction body 34) was bent with the sliding plane member 21 inside so as to form the half cylindrical junction body 34 (inner diameter of the sliding plane member 21 about 300 mm, width 300 mm).

Then, as shown in FIGS. 7A to 7G and FIG. 3, on the inside peripheral surface of the half cylindrical base member 22 (width 300 mm, inner diameter 300 mm, outer diameter 450 mm, made of S45C (carbon steel for machine structural use)), a Cu solder sheet (thickness 500 μm, Sn: 0.75 wt %) was inserted. Then, the junction body 34 bent into a half-cylindrical shape (the intermediate member 41 having the sliding plane member 21 bonded thereon) was placed on the joining member 24 to burn it at 250° C. for 5 minutes in an atmosphere of nitrogen gas, so that the sliding material 40 was made by bonding the base member 22 to the intermediate member 41 of the junction body 34.

Next, as shown in FIG. 3, by using two (2) segments of the sliding members 14B made of the sliding material 40, the two-divided cylindrical guide bearing member 12 was manufactured and assembled into a generator for verifying the bearing performance and the reliability in the same way as in Example 1. The low friction, the wear resistance, and the seizure resistance were confirmed under the conditions of start/stop of the generator, various load changes, and high-bearing stress and high-speed operations. As a result, even in the long-term reliability test on the severe conditions, the peeling and the breaking were not recognized on the junction interface between the sliding plane member 21 and the base member 22 and the bearing damage did not occur.

Example 3

As shown in FIGS. 13A to 13D, the intermediate member 51 was fabricated by linearly arranging the oval-shaped protrusions 52 (width w=3 mm, length L=6 mm, overhung height h=0.6 mm) on the top surface 25A of the component member 25 (thickness t=0.8 mm, width 300 mm, length 375 mm, made of a cold rolling steel plate) at an interval of pitch P31=7.5 mm while perpendicularly arranging them at an interval of pitch P32=7.5 mm, and furthermore, by linearly arranging the through-holes 55 (diameter 3 mm) at intervals P33=7.5 mm while perpendicularly arranging them at an interval of pitch P34=7.5 mm.

The intermediate member 51 was placed in the molding die 31 (FIGS. 7A to 7D), which was then filled up with the powder 32 of the polytetrafluoroethylene resin material forming the sliding plane member 21. Then, while impregnating a portion of the space 53 and the through-hole 55 of the intermediate member 51 with a portion of the polytetrafluoroethylene resin material under a pressure of about 500 kgf/cm$^2$, a polytetrafluoroethylene resin material layer with a thickness of about 3 mm was formed on the intermediate member 51. Thereafter, by burning the layer by heating the same at 375° C. for 60 minutes, the junction body 34 was produced by bonding the sliding plane member 21 made of the polytetrafluoroethylene resin material to the intermediate member 51.

Next, the intermediate member 51 having the sliding plane member 21 bonded thereon (the junction body 34) was bent with the sliding plane member 21 inside so as to form the curved planar junction body 34 (radius of curvature of the inner peripheral face of the sliding plane member 21: about 500 mm, width: 300 mm).

Then, as shown in FIGS. 7A to 7G and 4, on the inside peripheral surface of the base member 22 (width: 300 mm, radius of curvature of the inside peripheral face: 500 mm, length in the circumferential direction of the inside peripheral face: 350 mm, radius of curvature of the outside peripheral face: 570 mm, made of S45C (carbon steel for machine structural use)), a Cu solder sheet (thickness 500 μm, Sn: 0.75 wt %) to be the joining member 24 was inserted. Then, the bent junction body 34 (the intermediate member 51 having the sliding plane member 21 bonded thereon) was placed on the joining member 24 to burn the same at 250° C. for 5 minutes in an atmosphere of nitrogen gas, so that the sliding material 50 was made by bonding the base member 22 to the intermediate member 51 of the junction body 34.

Next, as shown in FIG. 4, by using eight (8) segments of the sliding members 14B made of the sliding material 50, the 8-divided cylindrical guide bearing member 12 was manufactured and assembled into a generator for verifying the bearing performance and the reliability in the same way as in Example 1. The low friction, the wear resistance, and the seizure resistance were confirmed under the conditions of start/stop of the generator, various load changes, and high-bearing stress and high-speed operations. As a result, even in the long-term reliability test on the severe conditions, the peeling and the breaking were not recognized on the junction interface between the sliding plane member and the base member 22 and the bearing damage did not occur.

What is claimed is:

1. A sliding material comprising:
   a sliding plane member made of one of a resin material and a composite resin material;
   a base member made of a metallic material different from that of the sliding plane member;
   an intermediate member provided between the sliding plane member and the base member and including a plurality of spaces; and
   a joining member for bonding the intermediate member to the base member,
   wherein a portion of the space of the intermediate member is impregnated with a portion of the sliding plane member so that the sliding plane member is bonded to the intermediate member, and residual portion of the space of the intermediate member is impregnated with a portion of the joining member so that the base member is bonded to the intermediate member with the joining member therebetween.

2. The material according to claim 1, wherein the intermediate member is a plate-shaped metallic component member, and at least one of the top surface and the bottom surface of the component member is provided with a plurality of convex-shaped protrusions to form the space inside, and the protrusion is formed with an opening for communicating the top surface with the bottom surface of the component member.

3. The material according to claim 2, wherein the protrusion is linearly formed and both ends thereof are integrated with the component member, and openings are formed at a lower portion of the protrusion in a direction perpendicular to the linear direction so as to oppose to each other for communicating the top surface with the bottom surface of the component member.

4. The material according to claim 2, wherein the protrusion is circularly formed and periphery thereof is integrated with the component member, and an opening is formed at a most projected position of the protrusion for communicating the top surface with the bottom surface of the component member.

5. The material according to claim 2, wherein one end of the protrusion is integrated with the component member while the other end is provided with an opening directed in a same direction with respect to the component member for communicating the top surface with the bottom surface of the component member.

6. The material according to claim 1, wherein the intermediate member is provided with a plurality of same or different protrusions formed on at least one of the top surface and the bottom surface of the component member in a linear arrangement or in a staggered arrangement.

7. The material according to claim 1, wherein the sliding plane member is made of either one of a polytetrafluoroethylene (PTFE) resin material, a polyetheretherketone (PEEK) resin material, a polyimide (PI) resin material, and a composite resin material made by adding ceramic fibers or particle fillers to any one of the resin materials.

8. The material according to claim 1, wherein the joining member is made of a metallic material of Sn with a melting point lower than that of the sliding plane member or with the melting temperature lower than that of the sliding plane member.

9. A bearing assembly comprising a thrust bearing member for slidably supporting a thrust load in an axial direction of a rotational shaft or a guide bearing member for slidably supporting a shaft vibration in a rotational direction of the rotational shaft, the thrust bearing member and the guide bearing member being formed by using a sliding material, which comprises: a sliding plane member made of one of a resin material or composite resin material; a base member made of a metallic material different from that of the sliding plane member; an intermediate member provided between the sliding plane member and the base member and including a plurality of spaces; and a joining member for bonding the intermediate member to the base member, wherein a portion of the space of the intermediate member is impregnated with a portion of the sliding plane member so that the sliding plane member is bonded to the intermediate member, and residual portion of the space of the intermediate member is impregnated with a portion of the joining member so that the base member is bonded to the intermediate member with the joining member therebetween.

* * * * *